United States Patent
Bott et al.

(10) Patent No.: US 11,686,685 B2
(45) Date of Patent: Jun. 27, 2023

(54) INSPECTION SYSTEM

(71) Applicant: Pharmacontrol Electronic GmbH, Heppenheim (DE)

(72) Inventors: Juergen Bott, Gross-Umstadt (DE); Dirk Brauch, Lorsch (DE)

(73) Assignee: PHARMACONTROL ELECTRONIC GmbH, Heppenheim (DE)

( * ) Notice: Subject to any disclaimer, the term of this patent is extended or adjusted under 35 U.S.C. 154(b) by 0 days.

(21) Appl. No.: 16/829,492

(22) Filed: Mar. 25, 2020

(65) Prior Publication Data
US 2020/0314351 A1    Oct. 1, 2020

(30) Foreign Application Priority Data

Mar. 29, 2019   (EP) ..................... 19166216

(51) Int. Cl.
*G06T 7/00* (2017.01)
*H04N 23/56* (2023.01)
*H04N 23/69* (2023.01)
*H04N 23/698* (2023.01)
(Continued)

(52) U.S. Cl.
CPC ....... *G01N 21/8806* (2013.01); *G06T 7/0004* (2013.01); *H04N 23/56* (2023.01);
(Continued)

(58) Field of Classification Search
CPC .. H04N 5/247; H04N 5/2256; H04N 5/23238; H04N 5/23296; H04N 23/56;
(Continued)

(56) References Cited

U.S. PATENT DOCUMENTS

| 5,729,340 A | 3/1998 | Griesbeck et al. |
| 7,104,453 B1 * | 9/2006 | Zhu .................... G06K 7/10861 235/462.14 |

(Continued)

FOREIGN PATENT DOCUMENTS

| CN | 107860366 A * | 3/2018 | ............. G01C 11/00 |
| DE | 102010032410 A1 | 2/2012 | |

(Continued)

OTHER PUBLICATIONS

English translation of DE102012100987 (Year: 2013).*
(Continued)

*Primary Examiner* — Matthew K Kwan
(74) *Attorney, Agent, or Firm* — Buchanan Ingersoll & Rooney PC

(57) ABSTRACT

Inspection system for visually inspecting objects, such as the surface of objects, during their transport along a transport path, the system including a free space allowing the objects to pass through the system and including an inspection area in which the objects are inspected visually, an illumination device for illuminating at least the peripheral surface of an object in the inspection area, and a plurality of camera/sensor devices, each being configured to take an image of a surface section of said peripheral surface in its respective field of view by receiving light running along a respective light path from the illuminated object to the camera/sensor device, the fields of view of the camera/sensor devices in combination providing for full peripheral coverage of azimuth angle 360° of the inspection area wherein the length of at least one of the light paths is longer than the spatial distance between its ends.

21 Claims, 6 Drawing Sheets

(51) Int. Cl.
*H04N 23/90* (2023.01)
*G01N 21/88* (2006.01)

(52) U.S. Cl.
CPC ........... *H04N 23/69* (2023.01); *H04N 23/698* (2023.01); *H04N 23/90* (2023.01); *G01N 21/8851* (2013.01)

(58) Field of Classification Search
CPC ...... H04N 23/69; H04N 23/698; H04N 23/90; G06T 7/0004; G01N 21/8851; G01N 21/9009; G01N 21/8806; G01N 2021/845; G06K 9/78; G06K 17/0003; G06K 7/10861; G06V 20/20; G06V 10/145
USPC .......................................................... 348/38
See application file for complete search history.

(56) References Cited

U.S. PATENT DOCUMENTS

| | | | |
|---|---|---|---|
| 2009/0244265 A1* | 10/2009 | Ishiyama | H04N 13/282 348/E13.074 |
| 2011/0050884 A1 | 3/2011 | Niedermeier et al. | |
| 2011/0102783 A1 | 5/2011 | Wiemer et al. | |
| 2013/0208105 A1 | 8/2013 | Schmidt et al. | |
| 2013/0250040 A1* | 9/2013 | Vitsnudel | H04N 13/373 348/36 |
| 2014/0152845 A1* | 6/2014 | Seger | G02B 27/62 348/188 |
| 2020/0134773 A1* | 4/2020 | Pinter | G06T 7/521 |

FOREIGN PATENT DOCUMENTS

| | | |
|---|---|---|
| DE | 102012100987 B3 | 7/2013 |
| EP | 2290355 A2 | 3/2011 |
| EP | 2924419 A2 | 9/2015 |

OTHER PUBLICATIONS

English Translation of Sun et al. CN107860366. (Year: 2018).*
Extended European Search Report dated Sep. 5, 2019, issued by the European Patent Office in the corresponding European Patent Application No. 19166216.2-1230. (8 pages).

* cited by examiner

INSPECTION SYSTEM

RELATED APPLICATION

This application claims priority under 35 U.S.C. § 119 to European Patent Application No. 19166216.2 filed in Europe on Mar. 29, 2019, the entire content of which is hereby incorporated by reference in its entirety.

FIELD

The present disclosure is related to inspection systems for visually inspecting objects, such as a surface of an object, during transport along a transport path, the system including a free space allowing the objects to pass through the system and including an inspection area in which the objects are inspected visually, an illumination device for illuminating at least the peripheral surface of an object in the inspection area, and a plurality of camera/sensor devices, each of them being configured to take an image of a surface section of the peripheral surface in its respective field of view by receiving light running along a respective light path from the illuminated object to the camera/sensor device, the fields of view of the camera/sensor devices in combination providing for full peripheral coverage of azimuth angle 360° of the inspection area.

BACKGROUND INFORMATION

Such inspection systems are known. The reason for providing the 360° coverage is that in product lines, objects such as cylindrical (circular cylinder) objects, may arrive at the inspection system in an unoriented manner, such that it is not sufficient to inspect only one or two lateral sides of the object by a camera system arranged to the left and to the right of the transport path since the decisive part of the surface, for instance a bar code or other code or alphanumeric chain on a label of the product, could be outside the field of view of the lateral camera systems. Although there are known systems having a further station with again two lateral camera systems and providing a 90° rotation of the object in between both stations/inspection areas, providing thus for not a full peripheral coverage of 360° of one inspection area, there are also those systems where more than two cameras are used for the full peripheral coverage of 360° of the same inspection area. Such a system is for instance disclosed in DE 10 2012 100 987 B3.

The system disclosed therein includes four cameras azimuthally spaced apart by 90° and in a 45° position with respect to the transport path. By having an optical element in the light path of each camera which can be switched between a transparent state and a non-transparent state, the system can be used for instance for inspecting labels of bottles passing through the system with the optical element in the transparent state, and for through-inspection of the bottle by using the optical element in the non-transparent state as illumination device for the camera on the other side of the transport path.

Other systems refrain from full peripheral coverage of the inspection area, making use of only one camera on each side of the transport path and using a splitting of the light path of a camera in three split light paths, while the inspected containers, after passing the system, are rotated by 90° and pass through an identical system thereafter. Such systems are disclosed in EP 2 924 419 A2.

Further, the company Cognex developed an inspection system under the trade name Omniview which is optimized for label inspection. Namely, label inspection becomes increasingly important to check not only for correct product identification, but also, for instance, for expiry dates and other visually readable information from the label and its correctness, such that incorrectly labeled products can be taken out of the transport path. This system has a similar camera arrangement as in DE 10 2012 100 987 B3. The four cameras are each separately mounted on a distance holder at some distance from the transport path and are each connected to a central image evaluation (such as a PC operation desk/an electrical cabinet) where a seamless image composed of the images taken by the cameras is created.

Such systems as well as a system as disclosed herein can be used in the food industry, but also in other industries as for consumer goods (cosmetics) or pharmaceuticals where some kind of end control by visual inspection is required or beneficial, as for instance to control not only product identification, but also for instance expiry dates of medicinal products.

Each of those systems as described above or otherwise known in the art have their pros and cons and are designed to optimize visual inspection with respect to the intended field of application.

SUMMARY

An inspection system is disclosed for visually inspecting objects, during their transport along a transport path, the system comprising: a free space allowing objects to pass through the system and including an inspection area (A) in which objects are inspected visually; an illumination device for illuminating at least the peripheral surface of an object when in the inspection area; and a plurality of camera/sensor devices, each configured to take an image of a surface section of said peripheral surface in its respective field of view by receiving light running along a respective light path from the illuminated object to the camera/sensor device, the fields of view of the camera/sensor devices in combination providing for full peripheral coverage of azimuth angle 360° of the inspection area, wherein a length of at least one of the light paths is longer than a spatial distance between its ends (S, E).

A module formed as a construction part for a facility is also disclosed in which objects are transported and inspected during their transport, said module comprising: a housing; an inspection system having a free space allowing objects to pass through the system and including an inspection area (A) in which objects are inspected visually; an illumination device for illuminating at least the peripheral surface of an object when in the inspection area; and a plurality of camera/sensor devices, each configured to take an image of a surface section of said peripheral surface in its respective field of view by receiving light running along a respective light path from the illuminated object to the camera/sensor device, the fields of view of the camera/sensor devices in combination providing for full peripheral coverage of azimuth angle 360° of the inspection area; wherein a length of at least one of the light paths is longer than a spatial distance between its ends (S, E); and wherein components of the inspection system are connected with and arranged within the housing such that at least one of mounting or removal of the housing from the facility automatically leads to providing/removal of said components.

An arrangement is also disclosed comprising: a supporting rack; and a module having a housing; an inspection system having a free space allowing objects to pass through the system and including an inspection area (A) in which objects are inspected visually; an illumination device for illuminating at least the peripheral surface of an object when in the inspection area; and a plurality of camera/sensor devices, each configured to take an image of a surface section of said peripheral surface in its respective field of view by receiving light running along a respective light path from the illuminated object to the camera/sensor device, the fields of view of the camera/sensor devices in combination providing for full peripheral coverage of azimuth angle 360° of the inspection area; wherein a length of at least one of the light paths is longer than a spatial distance between its ends (S, E); and wherein components of the inspection system are connected with and arranged within the housing such that at least one of mounting or removal of the housing from the arrangement automatically leads to providing/removal of said components, the module being height-adjustable with respect to the supporting frame.

BRIEF DESCRIPTION OF THE DRAWINGS

Further features, details and advantages of the invention will be recognizable from the subsequent detailed description of embodiments shown in the attached figures, wherein.

DETAILED DESCRIPTION

Figure 1:
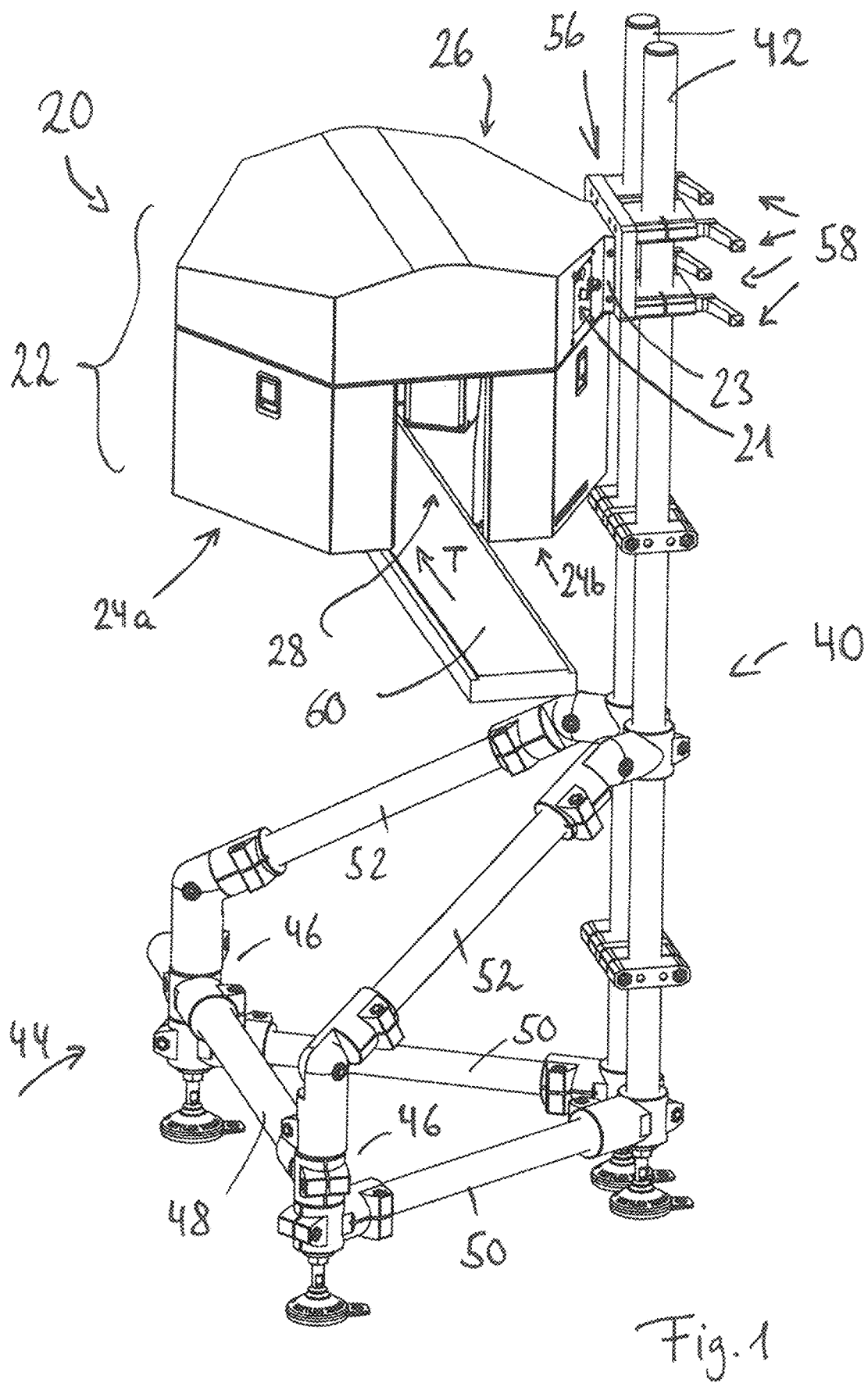
FIG. 1 is a perspective view of an exemplary inspection system and a supporting frame, as disclosed herein.

The present disclosure provides for an inspection system which is improved regarding a compromise of ease of application for a considerable number of applications in particular in the field of food and/or for instance the cosmetics industry or pharmaceutical industry and a reasonable reliability regarding accuracy of label reading.

Inspection systems as disclosed can include at least one of the light paths being longer than the spatial distance of its ends. This enables the system to be quite compact with still satisfying depth of focus for improved reliability of image recognition in the evaluation of the images taken of the product in the inspection area and covering the full label irrespective of the orientation of the object with respect to the transport direction by the full peripheral coverage of azimuth angle of 360°, leading thus to a broad level of applicability for use of the system.

The following exemplary conventions for directions are given. The transport direction T being the direction of the transport path (more specifically, the tangent to the transport path when considering also a curved transport path), while a sidewise direction or width direction orthogonal to the transport direction to the left and to the right span, together with the transport direction, an area named "reference plane", which is, for several exemplary applications, the horizontal plane. An object being un-oriented in the reference plane, that is having an arbitrary rotational position with respect to its rotational center axis (the symmetry axis of, for instance, cylindrical products) can still be visually inspected in the inspection area about its entire peripheral (circumferential) surface when the inspection area is fully covered by the fields of view of the plurality of camera/sensor devices for an azimuth angle of 360°, the azimuth angle lying within the reference plane (see FIG. 5 in the figurative description).

Further, regarding the light path, what is meant for geometrical description is the central ray of the field of view of the camera.

In an exemplary embodiment, there is only one light path with no splitting of the light path into several split portions running on different ways, for the light running from a section of the illuminated surface of the object to one, respectively each camera/sensor device.

In an exemplary embodiment, at least one light path has a first portion with a major path direction component being in the reference plane and a second portion with a major path component along a reference axis normal to the reference plane. That is, for instance for major applications where the reference plane is the horizontal plane, the major path direction lies within the horizontal plane, meaning that a vertical component of the path direction of the first portion is lower than its horizontal component. Preferably, it is for example, even lower than 50% of the horizontal component. The image area is for example, preferably placed centrally in the surface curvature of the object, to have image center and image border at essentially the same distance from focus.

In an exemplary embodiment, the path direction of the first portion is fully in the reference plane and in particular fully radial with respect to a center of the inspection area. The same holds, the other way round, for the major path component of the second portion. Here, the major path component is along a reference axis normal to the reference plane, for major applications along the vertical or height axis. In an exemplary embodiment, the other component apart from the vertical component is less than half of the vertical component, preferably for example, the major path component of the second portion is along the reference axis normal to the reference plane.

This allows equalizing installation space by shifting installation space from the width to the height direction maintaining an acceptable depth of focus.

In an exemplary embodiment, a ratio by which the path length of one of the first and second portions is larger than the other is lower than 2, for example, lower than 1.2, in particular lower than 0.6. This can bring advantages in the installation space regarding deflection means for the direction change of the light path.

With visual inspection, label reading, specifically unoriented 2D-data matrix reading, bar code reading, secure detection/pattern matching of alphanumeric chains including for instance best-before data and LOT control or product identification control (right pack, right product, RPRP requirement), the full peripheral coverage of 360°, can be provided. Moreover, in an exemplary embodiment the field of views of, as seen in circumferential direction, next-but-one neighbored camera/sensor devices overlap. The overlap, given at the peripheral surface of the inspected object, allows patterns of greater circumferential length to be caught by one of the camera/sensor devices alone in its entirety more easily. Namely, given by the rotationally arbitrarily oriented objects passing through the inspection system, the 360° coverage of for instance a bar code being in the cross-over of the fields of view of directly neighbored camera/sensor devices is recognizable, but involves combined evaluation of both images taken from said neighbored couple of camera/sensor devices, wherein for the exemplary embodiment, the bar code is readable in its entirety by one camera/sensor device only.

In an exemplary embodiment, a first angle of view an in the reference plane of a camera/sensor device is lower than 30°, for example lower than 26°, for example, lower than 22° and for example, lower than 18°, and/or its second angle of view $α_v$ referenced by the reference axis is lower than 40°, for example lower than 36°, for example lower than 32°, in particular lower than 28°. This improves the depth of focus, in consideration thereof that the subsequent imaging, compensation for the fact that the inspection light is coming from a curved surface may be taken into account, if for instance objects with rounded contour or slightly conical objects are inspected, which are a main application of the inspection system in view of the increased difficulty to have those products in a rotationally oriented manner in the product line. In a further exemplary embodiment, in particular in combination with the previously discussed feature, the length of the light path is longer than 20 cm, for example longer than 28 cm, for example longer than 32 cm, and for example shorter than 72 cm, for example shorter than 54 cm, in particular shorter than 48 cm. This allows for saving installation space and increases flexibility for use of the inspection system also in already existing facilities having possibly already a plurality of fixedly installed production lines to transport the objects.

In an exemplary embodiment, the inspection system includes computing means (e.g., a specially programmed computer processor) for an evaluation of the images taken by the camera/sensor devices, wherein at least a part of the computing means is positioned locally where the evaluated images are taken. That is, contrary to existing systems where evaluation of the images taken is done centrally at some PC or electrical cabinet, for instance at an operator's desk installed at the product line, at least part, in particular including the part necessary for determining whether the inspected object complies with predefined conditions to be verified by inspection, is done locally at the measurement site. For example, it can be preferred that the spatial distance between the camera/sensor device and the location of the CPU evaluating the images taken from the camera/sensor device can be, compared to the length of the light path, lower than 2.4, lower than 2.0, for example lower than 1.6. This enhances self-employment of the inspection system for use as a modular part insertable in product lines as single component.

In an exemplary embodiment, it is provided that the evaluation of images taken by different camera/sensor devices or different subgroups of camera/sensor devices are computed separately in parallel. That means that there is not one common computing means handling the images taken by all the camera/sensor devices, but computing devices attributed to each camera/sensor device for subgroups of camera/sensor devices. For instance, in an exemplary embodiment having six camera/sensor devices, three CPUs are each attributed to a couple of two camera/sensor devices. The attribution may for example include a local attribution by having a local separation between the several CPUs and/or the spatial distance between the CPU attributed to its camera/sensor devices to the camera/sensor devices being lower than the average distance of said CPU to all camera/sensor devices.

The above features regarding the evaluation of the images taken are also considered advantageously independent of the relationship of the length of the light path to the spatial distance between its ends. Accordingly, exemplary embodiments independently and separately include an inspection system for visually inspecting objects, in particular the surface of objects, during their transport along a transport path, the system including a free space allowing the object to pass through the system and including an inspection area in which the objects are inspected visually, an illumination device for illuminating at least the peripheral surface of an object in the inspection area and a plurality of camera/sensor devices, each of them being configured to take an image of the surface section of the peripheral surface in its respective field of view, the fields of view of the camera/sensor devices in combination providing for full peripheral coverage (360°) of the inspection area, and computing means for an evaluation of the images taken by the camera/sensor devices, wherein at least a part of the computing means is positioned locally where the evaluated images are taken and/or wherein the evaluation of images taken by different camera/sensor devices or different subgroups of camera/sensor devices are computed separately in parallel and/or wherein subunits of the computing means attributed to one or a subgroup of camera/sensor devices are locally separated from each other.

It is to be understood that these inspection systems defined in the preceding paragraph are disclosed also in combination with one or more of the features of the previous and the following description.

Further, a cable connection between the camera/sensor devices and the computing means can be provided, wherein one and/or the average cable length connecting a camera/sensor device with the part of the computing means evaluating the image of the camera/sensor device is lower than 400 mm, for example, lower than 240 mm, in particular lower than 160 mm.

Further, as already mentioned, when the computing means includes more than one locally separated subunit, and each of the subunits is attributed to one or a subgroup of camera/sensor devices, one of the subunits can be configured as master unit and the other units can be configured as slave units.

This allows hierarchical organization in particular in the organization of the computing. Communication between the units can be done for instance via a bus system as for instance a can-open bus system. In exemplary embodiments, each subunit/CPU obtained information for a target pattern, the present set thereof to be verified by the CPU. Once the verification is positively confirmed by one of the camera/sensor devices via its attributed CPU, information is available that the underlying criterion is fulfilled and, accordingly, there is no need to remove the product which is defective in this regard, from the product line, which could be done by a subsequent sorting system, a pusher etc. In case that no such verification can be confirmed by any of the CPUs, a respective failure or rejection signal for the inspected product is generated and provided for instance to the overall control of the facility in which the inspection system is used.

In an exemplary embodiment, the computing means is configured to provide for an image to be taken upon a trigger signal. That is, by knowledge of the process and the charges of products to be passed through the inspection system, timing information is available indicative of when the product is in the inspection area, such that then the image is taken in synchronized timing, and also in case of stroboscopic illumination, synchronized timing of the illumination is done, as used to the skilled person.

In an exemplary embodiment, the camera/sensor devices are arranged symmetrically and have the same length of their light paths to the inspection area. That is, at least for cylindrical objects inspected, the conditions for image evaluation are the same for all the camera/sensor devices and image recognition is simplified.

As already mentioned, the evaluation of the images taken contains pattern/image recognition, in particular configured for one or more capabilities from the group including bar code recognition, 2D-code recognition, recognition of character strings. This allows for the most important objectives of the visual inspection mentioned above, further specified image software products can be used, for instance also for label quality and label application quality inspection, for instance by providing a seamless picture of the label carried by the object.

In an exemplary embodiment, at least one camera/sensor device comprises a mechanism for compensating for a varying object distance without moving of the camera/sensor device itself. That is, in a very simple construction of the inspection system, it could be provided specially designed for objects of a predefined lateral dimension/diameter, such simplification benefit providing some disadvantages in flexibility for the application range of the system. In order to be able to inspect also objects with differing diameter, the length of the light path is compensated in the art by repositioning of the camera/sensor devices with respect to the inspection area, for instance by means of displacement by displacement drives such as servomotors.

Contrary thereto, for all camera/sensor devices, a mechanism for compensating for a varying object distance without movement of the camera/sensor device itself can be provided, thereby achieving again saving in installation space and further simplification in structure.

This aspect is also seen advantageously irrespective of the properties of the length of the light path with respect to the spatial distance between its ends. Accordingly, an inspection system can be included for visually inspecting objects inspection system for visually inspecting objects, in particular the surface of objects, during their transport along a transport path, the system including a free space allowing the object to pass through the system and including an inspection area in which the objects are inspected visually, an illumination device for illuminating at least the peripheral surface of an object in the inspection area and a plurality of camera/sensor devices, each of them being configured to take an image of the surface section of the peripheral surface in its respective field of view, the fields of view of the camera/sensor devices in combination providing for full peripheral coverage of the inspection area, wherein at least one camera/sensor device includes a mechanism for compensating for varying object distance without moving of the camera/sensor device itself. It is to be understood that these inspection systems defined in the preceding paragraph are disclosed also in combination with one or more of the features of the previous embodiments.

In an exemplary embodiment, the compensation mechanism includes modification of a lens system of the camera/sensor device, wherein in particular the modification is made by applying a voltage to the lens system. This allows changing the focus of the lens system, such that moving of the camera/sensor device itself is no more necessary. One exemplary application for such lens systems would be liquid lens systems.

In an exemplary embodiment, it is provided that the compensation mechanism is controlled to be adjusted to a focus matching with a predefined dimension property such as diameter of the product to be inspected, the information being provided before inspection. This information can either be provided as electronic setup information, otherwise one could think of using sensors for measuring the required dimensions of the objects and to provide the control of the compensation mechanism with these measured values. For example, a temperature sensor is included in the compensation mechanism to provide for accurate focus adjustment by counter-compensating temperature drifts of the lens system, the sensor being for example, preferably integrated in the camera/sensor device.

As previously discussed, the inspection system can be designed and configured for compact installation space and is adapted to form a module in form of a construction part for a facility. To form such a module, the inspection system may be complemented by a housing to which the components of the inspection system are connected, preferably arranged within the housing, such that mounting and/or removal of the housing from the facility automatically leads to the providing/removal of the components. Therefore, integrating the inspection system in form of such a module into facilities becomes rather easy.

For example, a first interface for data and/or energy exchange with/supply to the inspection system and/or a second interface for mechanically coupling the module to the facility is provided. Regarding the second interface, a mechanical coupling unit is provided, for instance to couple the module to a supporting rack. The module can be configured for lateral attachment at one side of the housing, in particular only at one side of the housing.

In an exemplary embodiment, a maximum dimension of the housing transverse to the transport path is lower than twice the length of the at least one of the light paths, for example lower than 5/3, for example lower than 3/3, in particular lower than 7/5 thereof. This allows for a good combination of depth of focus and increased saving in installation space for the module.

In an exemplary embodiment, the module includes at least IP65 (according to DIN EN 60529), has an outer surface of stainless steel and/or has a weight of less than 36 kg, for example, preferably less than 28 kg, in particular less than 24 kg. This, on the one hand side, provides for a wide application range also in the food industry, and, on the other hand, still good manageability for its modular application.

Further, an arrangement can include a supporting frame and an inspection system according to any of the previously discussed aspects, in particular a module according to any of the previously discussed aspects, the module being in particular height-adjustable with respect to the supporting frame. Again, a lateral attachment (only) to the supporting rack can be provided. This allows for a better integrability in already existing facilities with production lines.

Further, a facility including a transport system for transporting objects along a transport path, and including an inspection system, a module and/or an arrangement according to any of the previously discussed aspects.

As partly already indicated above, the inspection system can have six image sensors placed 360° around the inspection area in which an upright standing product, which should be inspected, is standing. For symmetrical arrangement, the azimuthal distance between two cameras/image sensors may be 60°. For example, two image sensors are connected to one CPU board. The then provided three CPU boards evaluate the images from their attributed image sensors in parallel. Inspections of the visual inspections comprise one or more of reading of 1D/2D codes, reading alphanumeric string LCN, verification of graphical IDs on label carried by the product, and reading of expiry date an LOT number.

For example, focus on different product diameters without mechanical adjustment is integrated in the system. Components like the camera/sensor devices with image sensors, optics, lights of the illumination device and/or CPUs can be integrated in a housing. In some exemplary embodiments, the housing may not be larger than 720 mm in length and/or width direction, for example, less than 640 mm, in particular less than 560 mm, and/or less than 600 mm in height direction, for example less than 540 mm, in particular less than 480 mm. Even a housing size of less than 540 mm×540 mm×440 mm is achievable. The housing may be made of aluminum, but for example with an outer surface of stainless steel. The image processing may be made via smart cameras. An interface of the module may be provided for instance as Ethernet 100/1000 Mbit. Regarding sensor resolution (H×V), sensors with for instance in the range of 2-3 megapixels can be used, or even higher resolutions, for instance 1600 pixels×1200 pixels or above. For the lens system, a C-mount lens is preferred. However, other lenses are also envisaged and covered herein.

The inspection tact rate may be in the range 400 to 1000 parts per minute for example more than 480 ppm. To reduce error probabilities, also rates not higher than 800 ppm are envisaged. 600 ppm plus minus 10% gives a good compromise here.

Illumination is for example provided from above the inspection region, as is the arrangement of the camera/sensor device. Several configurations for the illumination device are to be considered, for instance an LED illumination of large area with diffusor disc. An annular form can for example, include LED spots, combined with an optic focusing the light cone of each LED to the surface of the object. The illuminating light path is for example under an angle in the region [45°; 65°] to the horizontal plane.

As already mentioned, in an exemplary embodiment the image evaluation is partly or entirely done within the module, while it is worth considering that within use of the inspection system not even an operator panel is necessary. However, one can attach an operator panel to the interface or a setup of the control system and/or for feeding the control system with data regarding charges of objects to be inspected.

Further, as already partly indicated, results of the inspection may be sent by a master CPU after having obtained the results of the slaves.

Further, the inspection system may have a further operation setup, in which only one or both of the camera/sensor devices in the three o'clock and nine o'clock position are active. This can be of advantage if the inspection system is used for objects deviating in their form from a circular cylindrical shape, such as to be easy orientable with respect to the transport direction.

FIG. 1 shows in a perspective view an inspection system in form of a module 20 mounted in a height-adjustable manner to a supporting rack 40. In this embodiment, supporting frame 40 includes two vertically arranged columns 42 on feet 43 able to level out unevenness of the floor where the supporting frame 40 is to be placed. In the lower portion of supporting frame 40, a base portion 44 is provided to give stability by having, in this embodiment, two further short vertical columns 46 interconnected with each other by horizontal bar 48 at their lower portion and interconnected with the vertical columns 42 at their bottom portion by connecting legs 50 and at their upper portion with slanted arranged connecting arms 52 to increase the stiffness of the supporting rack. At intervals, connecting elements 54 stabilizing connect both vertical columns 52 to each other. In the upper portion of vertical columns 42 a height-adjustable slide arrangement 56 can run along the vertical columns and can be fixed to them by clamping means 58 at a desired height. It is recognizable that, by using vertical columns 42 of different height, the module 20 can be arranged at a desired height, even higher than shown in FIG. 1.

This height will be determined by, in this embodiment, the height of a transport belt 60 configured to transport objects through the modules 20 along a transport direction T, to be level with the bottom of the module 20.

The inspection system, in the embodiment shown in FIG. 1 is exemplified by a module 20 which has a housing 22 comprising left and right wall portions 24a, 24b, and releasably attached to the left and right wall portions, a cover portion 26. An entry opening 28 and a (not shown in FIG. 1) exit opening (29) are provided to let the products to be inspected through the inspection system 20, that is through the inner space of housing 22.

In this embodiment, the outer shape of housing 22, when seen from the vertical direction (in the referenced plane), is essentially hexagonal. On one side of the housing 22, a mounting portion 23 is provided at the cover portion 26 for attachment to the slide arrangement 56 of the supporting frame 40.

Close to (mechanical) mounting interface 23, interface 21 is provided to provide a connection for data transfer and energy supply lines.

As can be understood from FIG. 1, in order to mount/dismount the inspection system 20 in a facility having transport band 60 and for instance supporting frame 40, it is only necessary to mechanically couple/decouple mounting portion 23 from the supporting frame 40 without any separate mounting/dismounting steps of single components of the inspection system subsequently described (e.g. to remove the module together with the frame).

Figure 2:
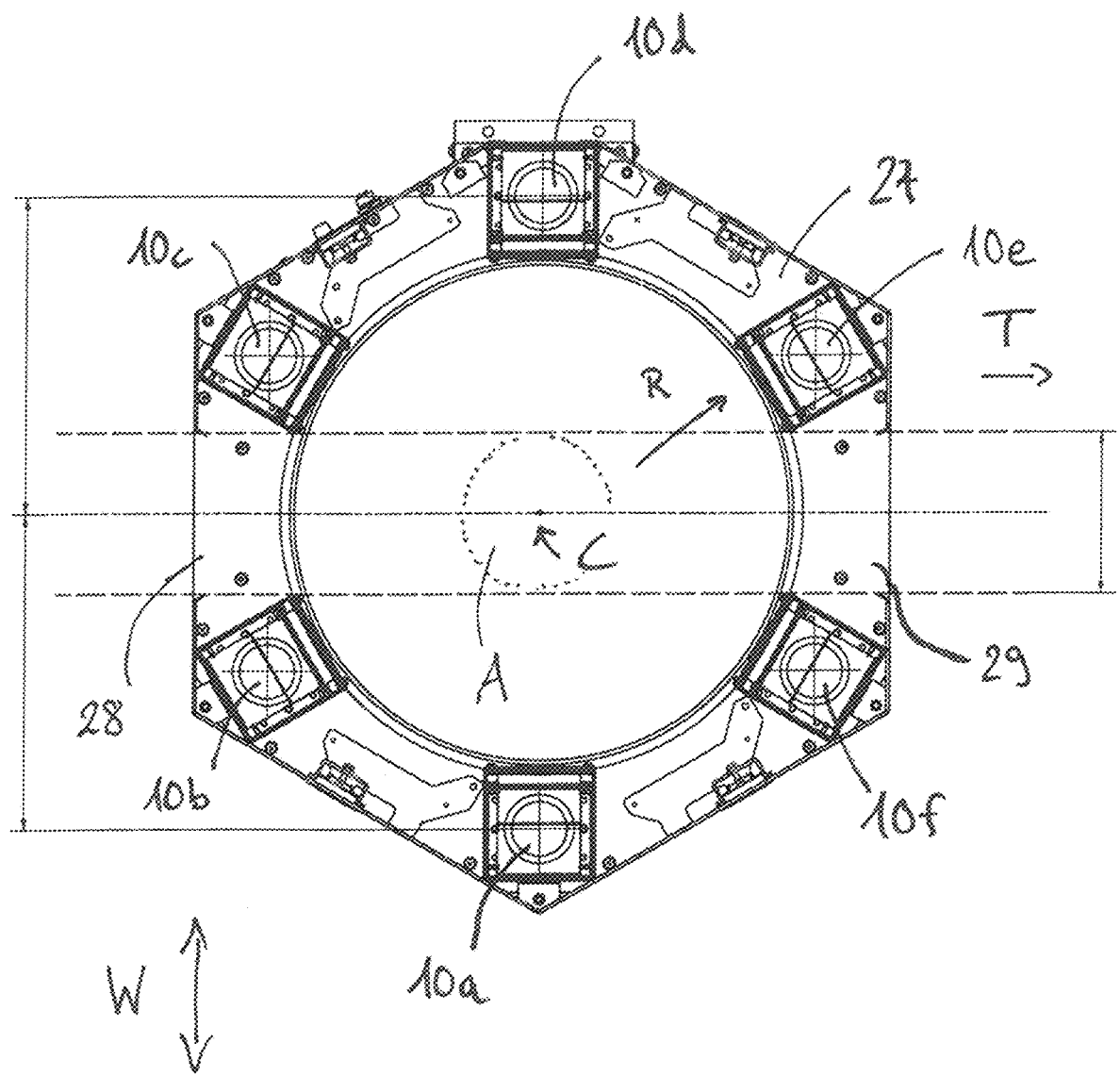
FIG. 2 shows an exemplary camera arrangement of the inspection system.

As is better visible from FIG. 2, six cameras 10 (10a to 10f) are arranged within a horizontal frame 27 in the upper portion of housing 22. Cameras 10 are, regarding the reference plane being a horizontal plane defined by the transport direction T and the width direction W, symmetrically arranged around center C of module 20 being also the center of an inspection area A in which the objects/products passing through the module 20 are inspected visually. The cameras 10a to 10f are equidistantly spaced in circumferential direction at an angular interval of 60°. That is, when the transport direction is directed to the 12 o'clock position, the cameras are arranged in the one o'clock, three o'clock, five o'clock, seven o'clock, nine o'clock and 11 o'clock position. However, the objective of each camera is not directed directly to the center C. Rather, as better visible from FIG. 3, the objective is directed to the vertical direction, as subsequently described in more detail with reference to FIG. 3.

Illumination of the inspection area A, respectively the surface 6 of objects 5 passing through the inspection area A is provided via illumination device 12 being composed of numerous single illumination spots 15 arranged, in the reference plane, in a circle around the center C to provide for uniform illumination. Each spot 15, here LED spot 15, has an optical element in front of it, which focusses the light core thereof onto the surface 6 of an inspected object 5. In the exemplified embodiment, a number of spots 15, here four spots, are grouped together for common mounting to the housing 22, in the present embodiment within the cover portion 26 of housing 22. The illumination device 12 is configured to allow stroboscopic illumination.

Figure 3:
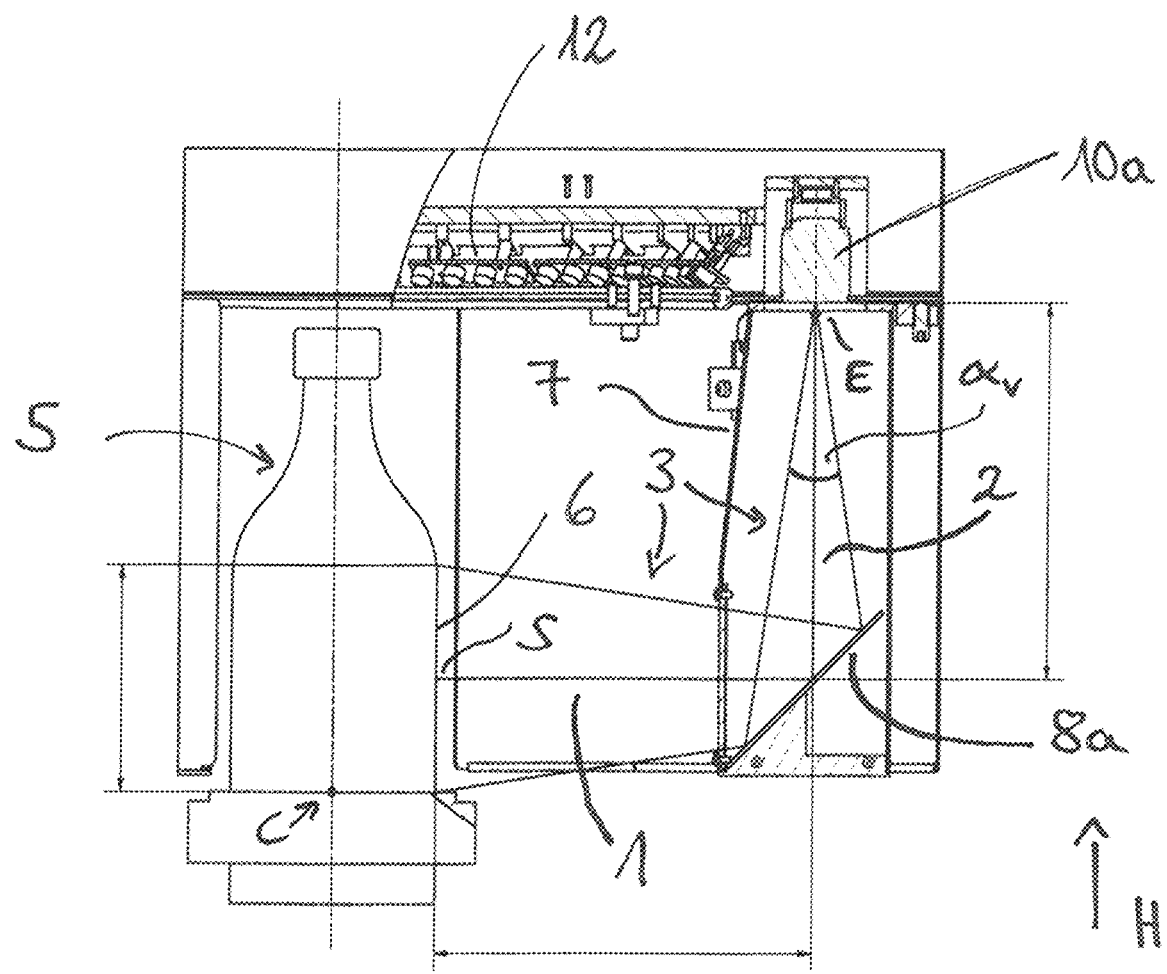
FIG. 3 shows an exemplary light path within the inspection system.
Figure 4:
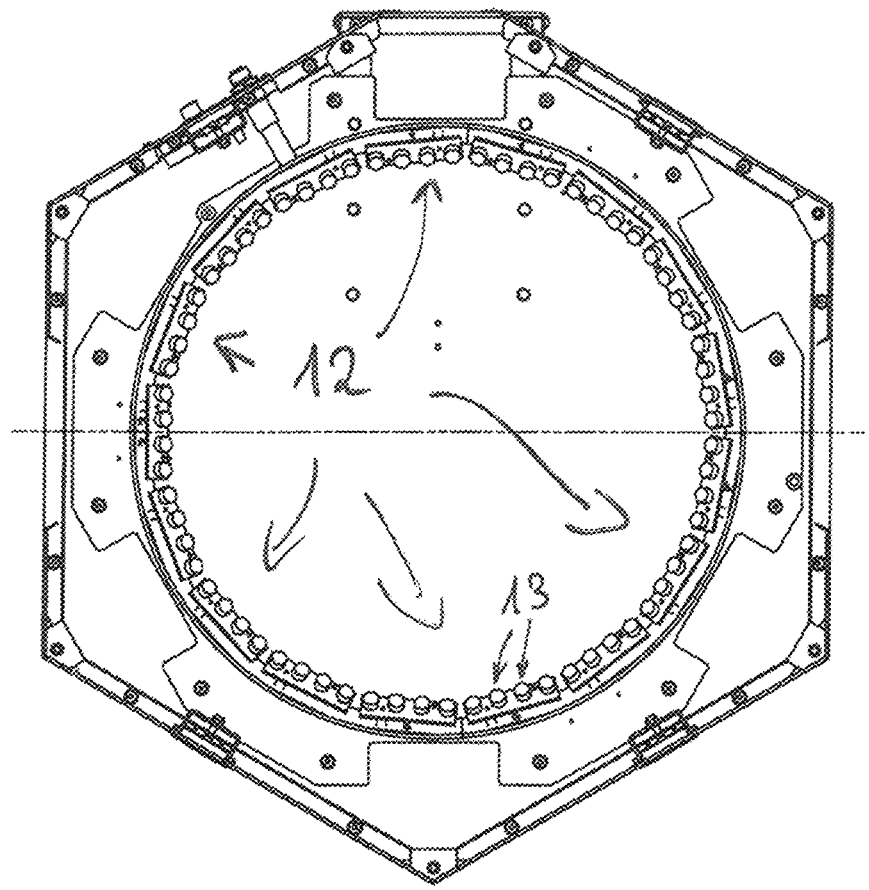
FIG. 4 shows an exemplary illumination device of the inspection system.

With reference now to FIG. 3, showing one side of the module 20 partly in a cross-section through camera 10a and partly an elevational view for showing the illumination device 12, it is recognizable that camera 10a is not directed directly to surface 6 of object 5, here a bottle. Rather, light from a surface 6 reaches camera 10a via a light path 3 comprising a first portion 1 arranged in W direction (for camera 10a), generally in radial direction with respect to the reference plane and center C, followed by a second portion 2 running along the vertical direction or height direction H (it is understood that, for characterizing the light path, the central ray is used). To this end, a mirror 8a is arranged in 45° inclination with respect to the reference plane (horizontal plane) to deflect the light beam 3. This situation is given for all other cameras 10b to 10f in symmetrical manner.

Figure 5:
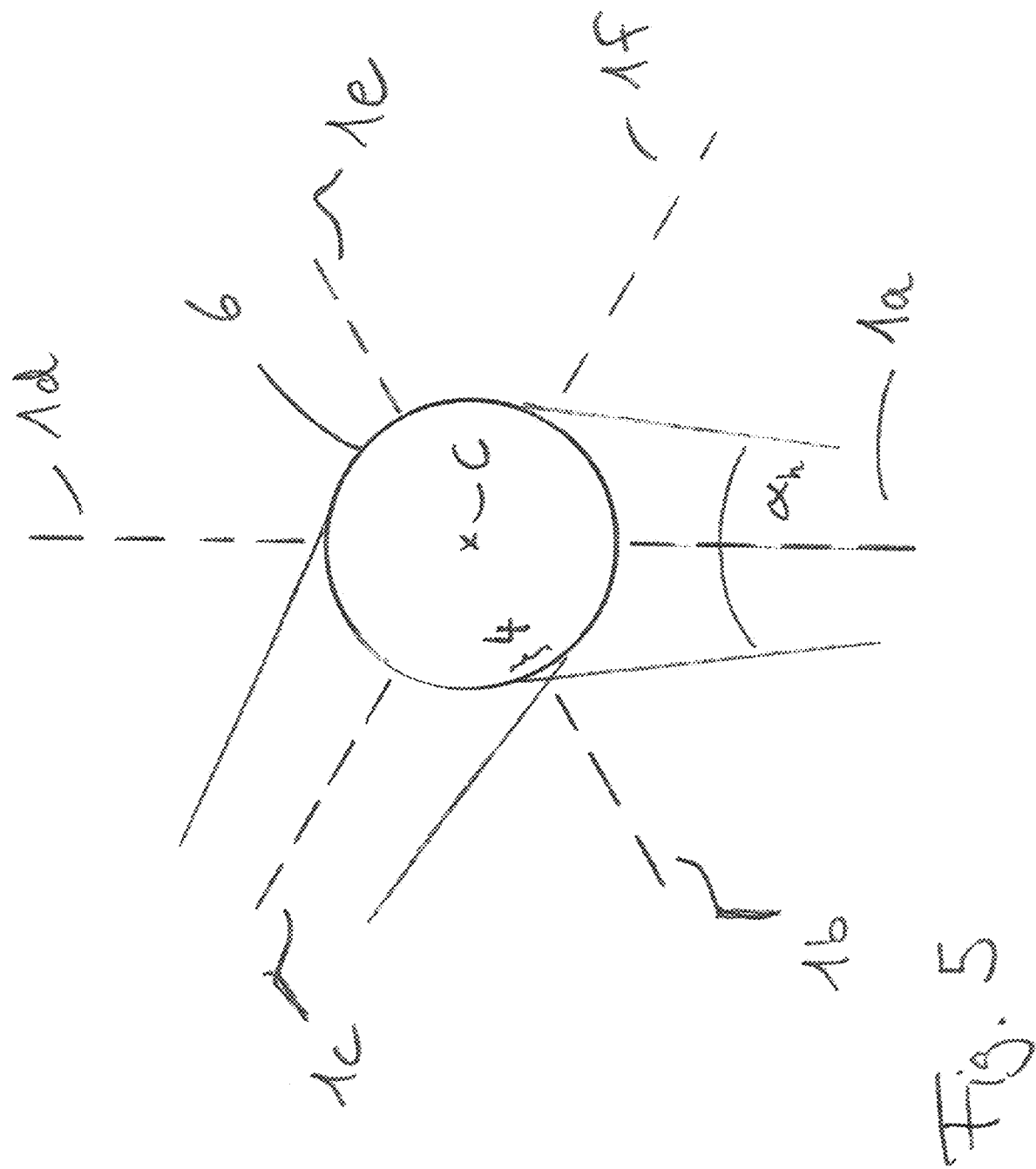
FIG. 5 schematically shows a 360° coverage provided by the inspection system.

In the exemplified arrangement, the (vertical) angle of view $\alpha_v$ is about 18°, the horizontal (first) angle $\alpha_h$ of view is about 14° (FIG. 5). Further, the lengths of the first portion 1 and the second portion 2 of light path 3 are approximately in the same range (with reference to an object 5 having a diameter corresponding to about the maximum diameter for which the inspection system 20 is adapted). A cover 7 blocks the light path 3 from unwanted incoming light other than by light path 3.

As recognizable from FIG. 3, the combined arrangement of illumination device 12, at about the same height as arrangement of cameras 10 and the use of mirrors 8 provide for a compact design of module 20 in transverse and height dimensions. In the exemplified embodiment, one has a ratio of maximum transverse width of the module 20 and light path length L of roughly 1.6, and a ratio of the height of the module 20 to the light path length L of light path 3 of roughly 0.94. It is understandable that the exemplified module, which is designed for a maximum product diameter of about 10 to 11 cm can be scaled up to accommodate/inspect larger products. The overall weight of the module 20 is only about 20 kg, such that the module 20 is easy to handle and does not require excessive strength and stiffness of supporting frame 40 or any other support structure.

As can be seen from FIG. 5, the fields of view 1a-1f of the combined cameras 10a to 10f provide for full 360° coverage of the peripheral or circumferential surface of 6 of object/product 5. Regarding top surface and bottom surface of product 5, the exemplified module as shown in the figures does not inspect these surfaces. However, also embodiments (not shown) are envisaged in which a further camera is centrally provided over the inspection area to visually inspect the top surface of product 5, while, additionally or alternatively, a further camera can be used to inspect the bottom.

What can further be seen from FIG. 5 is that the fields of view of next-but-one neighboured cameras, for instance of cameras 10a and 10c, overlap at the peripheral surface 6 of object 5 in an overlap region 4. Therefore (apart from pattern recognition, for instance barcode recognition available by the 360° inspection irrespective of the rotational orientation of object 5 in the reference plane) it is possible to read out barcodes by means of one camera only which otherwise would need combined reading out of two neighboured cameras, when the arbitrary rotational orientation of object 5 is unfavourably intermediate with respect to the positioning of the cameras. In a situation with the center of the bar code being in overlap region 4, camera 10b shall provide this.

In the exemplified embodiment, the cameras 10a to 10f are mounted to the housing 22 in a fixed relationship that is not movable as one could do when aiming to arrange the cameras to vary the height position of the camera 10 with respect to the mirror 8. Thereby, additional parts as drives in form of e.g. servomotors are omitted, for a simpler structure and lower weight. However, capability of setting a different focus in case of inspecting objects 5 with different diameters is provided for within the optical system of each camera 10. In particular, this is achieved by applying a voltage to modify the internal structure of the optical system/lens system. For the exemplified embodiment, a liquid lens is comprised in camera 10a. More specifically, in the exemplified embodiment a C-mount objective with integrated liquid lens is used, such as for instance the commercially available VariOptic® C-C39N0-250; however, similar systems can equally be used. Further, the inspection system 20 can include a temperature sensor to determine the actual temperature and to compensate for temperature drifts of the liquid lens system. The temperature sensor might also be integrated in the optical system of the camera itself. For example, the objective of the liquid lens can be focussed in a region of 120 mm to infinite. Further, in the embodiment, the camera sensor is a CMOS-sensor; however, other sensor technology can be used as e.g. CCD sensors.

Figure 6:
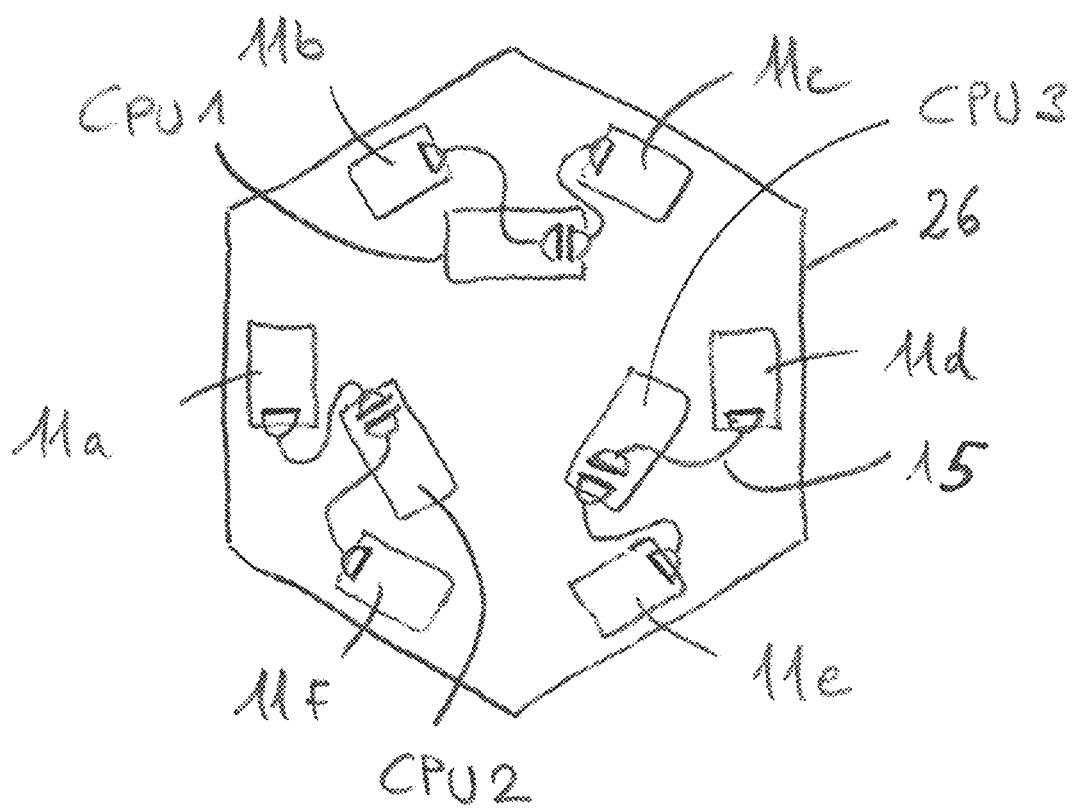
FIG. 6 schematically shows localized evaluation means of the inspection system.

As can be seen in FIG. 6, evaluation of images taken by cameras 10 is performed at least partly locally already at the measurement side. To this end, one or more computing units CPU1 to CPU3 are arranged close to, and/or, as in the exemplified embodiment, inside housing 22 and also close to sensor heads 11 of cameras 10. Moreover, subgroups of cameras and their sensors can be grouped together to be connected with one of the CPUs. In the exemplified embodiments, two cameras each are grouped to be connected to one CPU which is performing pattern recognition and image evaluation for these two cameras/sensors (for instance, CPU2 for 10a, 11a and 10f, 11f). It can for example, be preferred that two sensor heads 11 of two thereby coupled cameras 10 are arranged to have their data exit sides facing each other. This is to allow short cables 13 for connecting the sensor heads with the respective CPU. For example, the cable length of such connection is not larger more 400 mm, preferably for example, not more than 300 mm, in particular not more than 200 mm; in the exemplified embodiment, a cable 13 has a length of only about 160 mm.

In the exemplified embodiments, one of the provided CPUs is configured as master, and the other two as slaves. Masters and slaves may communicate via for instance an open-CAN bus system. In order to perform pattern reading such as barcode reading, 2D-code (matrix code), QR-code reading or other image recognition, CPUs are for example, provided beforehand with an archetype of patterns (codes, etc.) of the inspected charges to be subject of inspection/verification. Once suitable presence of such pattern coinciding with the archetype is established to be present for a product under inspection by one of the CPUs, the object/product can remain in the production line. Should the presence of a pattern corresponding to the archetype not be verified by any of the cameras/sensors, respectively their image evaluation, a signal is created indicating this defect, such that the respective product may be taken off the product line.

More complex forms of image evaluation can be performed, such as creating a full seamless picture of the peripheral surface 6 of an object 5 or a full seamless picture of one or more labels of the object 5.

The invention is not limited to the above described embodiments. Rather, features of the above description and of the subsequent claims can be, alone or in combination, essential for the invention in its various aspects.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An inspection system for visually inspecting objects, during their transport along a transport path, the system comprising:
- a free space allowing objects to pass through the system and including an inspection area (A) in which objects are inspected visually;
- an illumination device for illuminating at least the peripheral surface of an object when in the inspection area; and
- six camera/sensor devices equidistantly spaced, each configured to take an image of a surface section of said peripheral surface in its respective field of view by receiving light running along a respective light path from the illuminated object to the camera/sensor device, the fields of view of the camera/sensor devices in combination providing for full peripheral coverage of azimuth angle 360° of the inspection area,
- wherein a length of at least one of the light paths is longer than a spatial distance between its ends (S, E) and
- wherein the six camera/sensor devices and corresponding mirrors are arranged such that light from the peripheral surface reaches the respective camera/sensor device by running along a first portion of the respective light path with a major path direction component being in particular radial within a reference plane being a plane (T×W) of the azimuth angle and a second portion with major path component along a reference axis normal to said reference plane, wherein a ratio by which the path length of one of the first and second portions is larger than the other is selected to be lower than 2.

2. The inspection system according to claim 1, wherein a ratio by which the path length of one of the first and second portions is larger than the other is selected to be one of: lower than 1.2 or lower than 0.6.

3. The inspection system according to claim 1, wherein the fields of view, as seen in circumferential direction, of a next-but-one-neighbored camera/sensor devices overlap.

4. The inspection system according to claim 1, wherein a length of the light path is selected to be one of longer than 20 cm, longer than 28 cm, longer than 32 cm, or shorter than 72 cm, shorter than 54 cm, or shorter than 48 cm.

5. The inspection system according to according to claim 1, comprising: a processor configured for an evaluation of images taken by the camera/sensor devices, wherein at least a part of the processor is positioned locally where evaluated images are taken.

6. The inspection system according to claim 1, comprising:
- a processor configured for an evaluation of images taken by the camera/sensor devices, wherein evaluation of images taken by different camera/sensor devices or different subgroups of camera/sensor devices are computed separately in parallel.

7. The inspection system according to claim 6, wherein the processor comprises:
- more than one locally separated subunit, each of the subunits attributed to one or a subgroup of camera/sensor devices, wherein in particular one of the subunits is configured as master unit and the other units are configured as slave units.

8. The inspection system according to claim 1, wherein the camera/sensor devices are arranged symmetrically and have a same length of their light path to the inspection area.

9. The inspection system according to claim 1, wherein a processor is configured to provide an evaluation of the images which contains patterns and image recognition, configured for one or more capabilities from the group consisting of barcode recognition, 2-D code recognition, and recognition of character strings.

10. The inspection system according to claim 1, wherein at least one camera/sensor device comprises:
- a mechanism for compensating for a varying object distance without displacement of the camera/sensor device itself.

11. The inspection system according to claim 10, wherein the compensation mechanism comprises:
- a modified lens system of the camera/sensor device, configured such that modification will occur when a voltage is applied to the lens system.

12. The inspection system according to claim 1, wherein a ratio by which the path length of one of the first and second portions is larger than the other is selected to be one of: lower than 1.2 or lower than 0.6.

13. The inspection system according to claim 1, wherein a length of the light path is longer than 20 cm.

14. The inspection system according to claim 1, wherein the illumination device consists of an incident illumination device.

15. A module formed as a construction part for a facility in which objects are transported and inspected during their transport, said module comprising:
- a housing;
- an inspection system having a free space allowing objects to pass through the system and including an inspection area (A) in which objects are inspected visually;
- an illumination device for illuminating at least the peripheral surface of an object when in the inspection area; and
- six camera/sensor devices equidistantly spaced, each configured to take an image of a surface section of said peripheral surface in its respective field of view by receiving light running along a respective light path from the illuminated object to the camera/sensor device, the fields of view of the camera/sensor devices in combination providing for full peripheral coverage of azimuth angle 360° of the inspection area;
- wherein a length of at least one of the light paths is longer than a spatial distance between its ends (S, E);
- wherein the six camera/sensor devices and corresponding mirrors are arranged such that light from the peripheral surface reaches the respective camera/sensor device by running along a first portion of the respective light path with a major path direction component being in particular radial within a reference plane being a plane (T×W) of the azimuth angle and a second portion with major path component along a reference axis normal to said reference plane, wherein a ratio by which the path length of one of the first and second portions is larger than the other is selected to be lower than 2; and
- wherein components of the inspection system are connected with and arranged within the housing such that at least one of mounting or removal of the housing from the facility automatically leads to providing/removal of said components.

16. The module according to claim 15, wherein a maximum dimension of the housing transverse to the transport path is selected to be lower than at least one of twice a length of said at least one of the light paths, lower than 5/3, lower than 3/2, or lower than 7/5 thereof.

17. The module according to claim 15, wherein the module complies with at least IP65, and has at least one of an outer surface of stainless steel or a weight selected to be at least one of less than 36 kg, less than 28 kg, or less than 24 kg.

18. The module according to claim 15, wherein a maximum dimension of the housing transverse to the transport path is lower than twice a length of said at least one of the light paths.

19. The module according to claim 15, wherein the module complies with at least IP65, and has at least one of an outer surface of stainless steel or a weight of less than 36 kg.

20. An arrangement comprising:
    a supporting rack;
    a module having a housing;
    an inspection system having a free space allowing objects to pass through the system and including an inspection area (A) in which objects are inspected visually;
    an illumination device for illuminating at least the peripheral surface of an object when in the inspection area; and
    six camera/sensor devices equidistantly spaced, each configured to take an image of a surface section of said peripheral surface in its respective field of view by receiving light running along a respective light path from the illuminated object to the camera/sensor device, the fields of view of the camera/sensor devices in combination providing for full peripheral coverage of azimuth angle 360° of the inspection area;
    wherein a length of at least one of the light paths is longer than a spatial distance between its ends (S, E);
    wherein the six camera/sensor devices and corresponding mirrors are arranged such that light from the peripheral surface reaches the respective camera/sensor device by running along a first portion of the respective light path with a major path direction component being in particular radial within a reference plane being a plane (T×W) of the azimuth angle and a second portion with major path component along a reference axis normal to said reference plane, wherein a ratio by which the path length of one of the first and second portions is larger than the other is selected to be lower than 2; and
    wherein all of the components of the inspection system are connected with and arranged within the housing such that at least one of mounting or removal of the housing from the arrangement automatically leads to providing/removal of said components, the module being height-adjustable with respect to a supporting frame.

21. The arrangement according to claim 20, in combination with a facility, the facility comprising:
    a transport system for transporting objects along a transport path.

* * * * *

UNITED STATES PATENT AND TRADEMARK OFFICE
CERTIFICATE OF CORRECTION

PATENT NO. : 11,686,685 B2
APPLICATION NO. : 16/829492
DATED : June 27, 2023
INVENTOR(S) : Juergen Bott and Dirk Brauch It is certified that error appears in the above-identified patent and that said Letters Patent is hereby corrected as shown below:

In the Specification

Column 5, Line 4:
"an"
Should read:
$\alpha_h$

Column 8, Line 65:
"an LOT"
Should read:
and LOT

Column 9, Line 32:
"[45°; 65° ]"
Should read:
[45°; 65°]

Signed and Sealed this
Twelfth Day of September, 2023

Katherine Kelly Vidal
*Director of the United States Patent and Trademark Office*